United States Patent
Rannow

(10) Patent No.: US 9,423,800 B2
(45) Date of Patent: Aug. 23, 2016

(54) FAIL OPERATIONAL MODES FOR AN ELECTRO-HYDRAULIC SYSTEM

(71) Applicant: Eaton Corporation, Cleveland, OH (US)

(72) Inventor: Michael Berne Rannow, Roseville, MN (US)

(73) Assignee: Eaton Corporation, Cleveland, OH (US)

( * ) Notice: Subject to any disclaimer, the term of this patent is extended or adjusted under 35 U.S.C. 154(b) by 313 days.

(21) Appl. No.: 14/136,224

(22) Filed: Dec. 20, 2013

(65) Prior Publication Data

US 2014/0174543 A1  Jun. 26, 2014

Related U.S. Application Data

(60) Provisional application No. 61/745,939, filed on Dec. 26, 2012.

(51) Int. Cl.
    *F15B 20/00* (2006.01)
    *G05D 7/06* (2006.01)

(52) U.S. Cl.
    CPC ............ *G05D 7/0617* (2013.01); *F15B 20/00* (2013.01); *F15B 2211/634* (2013.01); *F15B 2211/6313* (2013.01); *F15B 2211/8626* (2013.01); *F15B 2211/8752* (2013.01); *Y10T 137/0318* (2015.04)

(58) Field of Classification Search
    CPC ................ F15B 20/002; F15B 11/042; F15B 2211/634; F15B 2211/8752; E02F 9/226
    USPC .............................................. 60/403; 701/50
    See application file for complete search history.

(56) References Cited

U.S. PATENT DOCUMENTS

| | | | |
|---|---|---|---|
| 9,163,387 B2 * | 10/2015 | Yuan ....................... | E02F 9/226 |
| 2011/0083750 A1 * | 4/2011 | Gehlhoff ............... | F15B 20/002 |
| | | | 137/12 |
| 2011/0094595 A1 * | 4/2011 | Schottler ............... | F15B 11/042 |
| | | | 137/12 |
| 2012/0232756 A1 | 9/2012 | Yuan et al. | |

FOREIGN PATENT DOCUMENTS

WO    WO 2012/118564 A2    9/2012

OTHER PUBLICATIONS

International Search Report and Written Opinion for PCT/US2013/076904 mailed Apr. 11, 2014.

* cited by examiner

*Primary Examiner* — Thomas E Lazo
(74) *Attorney, Agent, or Firm* — Merchant & Gould P.C.

(57) ABSTRACT

Methods for initiating and implementing fail operational modes in an electro-hydraulic system are disclosed. In one step, a plurality of valve assemblies is provided wherein each of the valve assemblies has a pressure sensor and a position sensor in communication with an electronic system controller. The valve assemblies are in fluid communication with a hydraulic actuator, for example a linear actuator or hydraulic motor. In one step, a fault condition with one of the sensors is detected. The method may also include the steps of determining the type and location of the sensor associated with detected fault condition. In another step, an actuator state is determined wherein the actuator is in a passive state or overrunning state. Another step is initiating and implementing one of a plurality of fail operational modes based on the determination of the sensor type and location, and the actuator state.

11 Claims, 17 Drawing Sheets

FAIL OPERATIONAL MODES FOR AN ELECTRO-HYDRAULIC SYSTEM

RELATED APPLICATIONS

This application claims priority to U.S. Provisional Patent Application Ser. No. 61/745,939, filed Dec. 26, 2012. The entirety of U.S. 61/745,939 is hereby incorporated by reference herein.

BACKGROUND

Work machines, such as fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. Work machines are commonly provided with electronic control systems that rely upon a number of inputs and outputs, for example, pressure sensors, position sensors, and valve actuators. Electro-hydraulic valves often rely on sensed values, such as port pressure and/or valve position to provide a stable, controlled flow to and from a hydraulic actuator, such as a linear actuator or motor. Typically, a failure in one of these sensors will render the actuator inoperable. Improvements are desired.

SUMMARY

Methods for initiating and implementing fail operational modes in an electro-hydraulic system are disclosed. In one step, a plurality of valve assemblies is provided wherein each of the valve assemblies has a pressure sensor and a position sensor in communication with an electronic system controller. The valve assemblies are in fluid communication with a hydraulic actuator, for example a linear actuator or hydraulic motor. In one step, a fault condition with one of the sensors is detected. In another step, a sensor type associated with the fault condition is detected wherein a first sensor type is a fault condition is associated with one of the pressure sensors and a second sensor type is associated with a fault condition one of the position sensors. In one step, a sensor location is detected wherein a first location is associated with a sensor located at an upstream side of the actuator and a second location is associated with a sensor located at a downstream side of the actuator. In another step, an actuator state is determined wherein the actuator is in a passive state or an overrunning state. Another step is initiating and implementing one of a plurality of fail operational modes based on the determination of the sensor type, the sensor location, and the actuator state associated with the fault condition.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
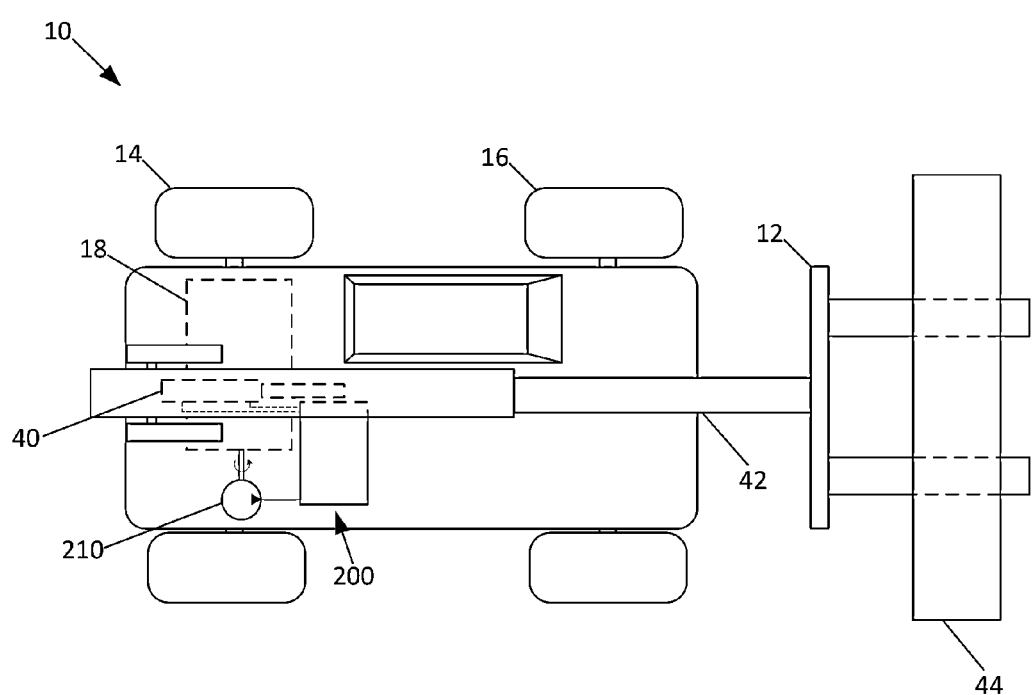
FIG. 1 is a schematic view of a work machine having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

General Description

As depicted at FIG. 1, a work machine 10 is shown. Work machine 10 includes a work attachment 12 for performing a variety of lifting tasks associated with a load 44. In one embodiment, work machine 10 is a telehandler having a telescoping boom 42 that supports the work attachment 12. In one embodiment, the work attachment 12 includes a pair of forks. However, one skilled in the art will appreciate that work attachment may be any hydraulically powered work implement.

Work machine 10 is also shown as including at least one drive wheel 14 and at least one steer wheel 16. In certain embodiments, one or more drive wheels 14 may be combined with one or more steer wheels 16. The drive wheels are powered by an engine 18. Engine 18 is also configured to power a hydraulic system including a work circuit 200 and a steering circuit (not shown) of the work machine 10 via at least one hydraulic pump 210. In one embodiment, pump 32 is mechanically coupled to the engine 18, such as by an output shaft or a power take-off. In one embodiment, pump 32 is powered indirectly by the engine 18 via a hydraulic system. The work circuit 200 actuates the work attachment 12 by operation of the pump in cooperation with a number of hydraulic actuators 40 and control valves 20, 120. In one embodiment, the work machine includes hydraulic actuators and valves for effectuating lifting, extending, tilting, and sideways motions of the work attachment 12.

Hydraulic System

Figure 2:
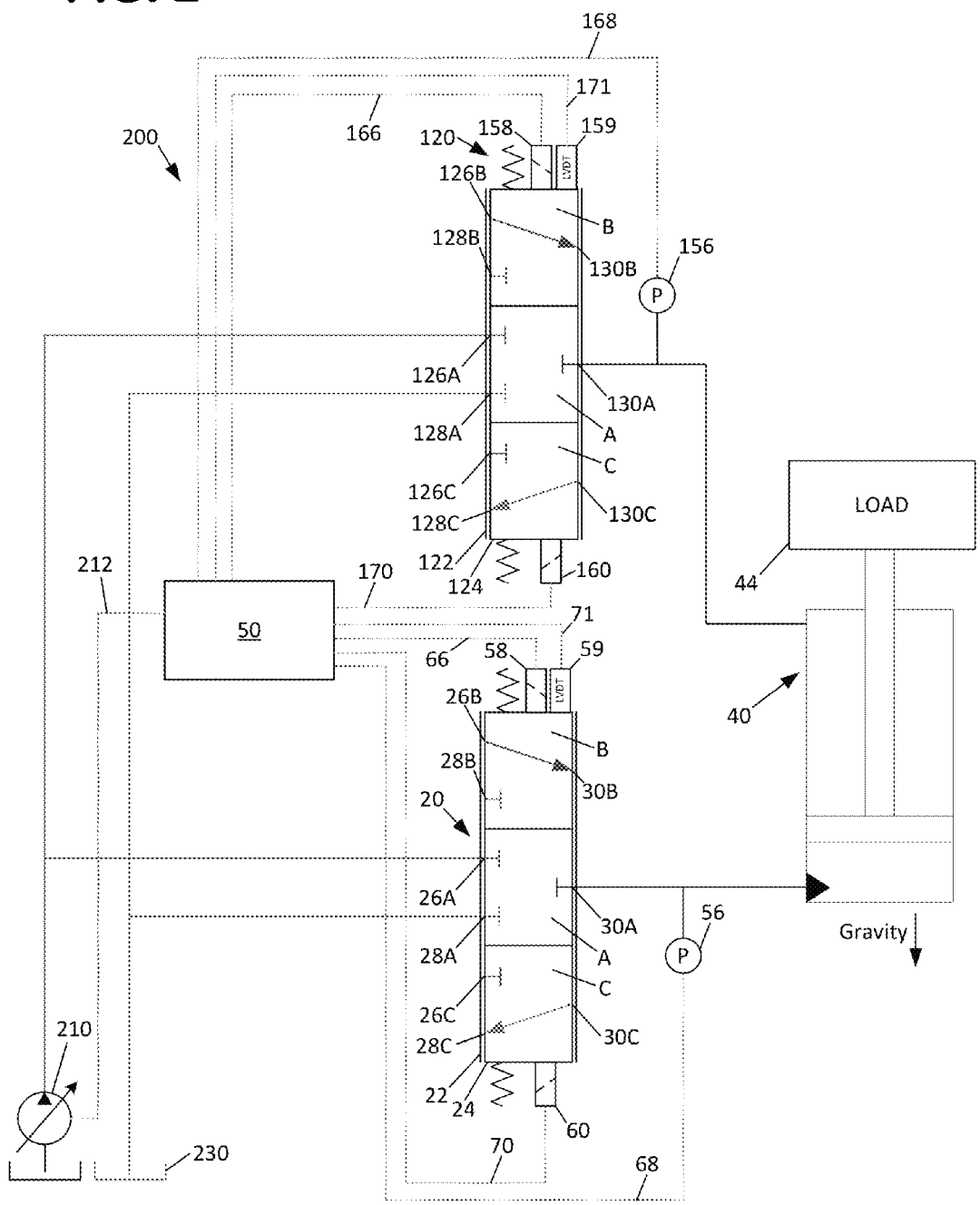
FIG. 2 is a schematic view of a portion of an electro-hydraulic system including a work circuit and actuator suitable for use in the work machine shown in FIG. 1.

Referring to FIG. 2, an example of a hydraulic system including a work circuit 200 and other components are shown. Work circuit 200 is for activating a work attachment of a work machine. As shown, work circuit 200 includes a first valve assembly 20 and a second valve assembly 120 for enabling a work function, such as an attachment lift function. Work circuit 200 may also include a plurality of additional valves and/or fluid power consuming components for enabling other functions in the hydraulic system. Furthermore, the work circuit may include a single valve assembly that combines the functions of the first and second valve assemblies 20, 120. In the particular embodiment shown, the first and second valve assemblies 20, 120 are proportional valves having a sleeve 22, 122 within which a spool 24, 124 is disposed.

The first valve assembly 20 is configured and arranged to selectively provide pressurized fluid from pump 210 to one or more hydraulic lift or work cylinders 40 which are mechanically coupled to the work attachment. Although cylinders 40 are characterized in this disclosure as being lift cylinders, it should be understood that cylinders 40 may be any type of work cylinder, and that the disclosure is not limited to only applications involving lift cylinders. Additionally, any type of actuator or combinations thereof may be used, for example, linear hydraulic actuators and motors. The operation of first valve assembly 20 causes the work attachment 202 to be selectively raised or lowered in a lifting function. The lifting speed of the lift cylinder(s) 40 is a result of the flow through the first valve assembly 20. Flow through the first valve assembly 20 can be controlled by a pair of variable solenoid actuators 58, 60 acting on each end of the spool 24 of the valve 20. The variable solenoid actuators 58, 60 can be operated by the control system 50 via control lines 66, 70, respectively. Additionally where solenoids or solenoid actuators are referenced in the application, it should be noted that the associated valves could be voicecoil driven valves. Additionally, multi-stage valves incorporating a main stage valve that is pilot operated by valves utilizing solenoids and/or voicecoils may be used.

As shown, the first valve assembly 20 is a three-position, three-way valve in fluid communication with the pump 210, a tank reservoir 230, and the lift cylinder(s) 40. In the embodiment shown, first valve assembly 20 is movable from a closed or neutral position A, to a lifting position B, and to a lowering position C.

In the closed position A, ports 26A, 28A, and 30A are closed such that the pump 210 and tank reservoir 230 are both isolated from the lifting cylinder(s) 40. In this position the work attachment 202 is held in a static position and can be neither raised nor lowered.

In the lifting position B, the first valve assembly 20 is positioned such that ports 26B and 30B are placed in fluid communication with each other. This position allows for the pump 210 to be placed in fluid communication with the lifting cylinder(s) 40. Where the pump pressure exceeds the pressure induced by a load 44, the hydraulic lift cylinder(s) will cause the load 44 to be raised. In the lifting position, the tank reservoir 230 is blocked at port 28B.

In the lowering position C, the first valve assembly 20 is positioned such that ports 28C and 30C are placed in fluid communication with each other. This position allows for the tank reservoir 230 to be placed in fluid communication with the lifting cylinder(s) 40. The lowering position C allows for fluid to drain from the lifting cylinder(s) 40 to the tank reservoir 230, thereby allowing for the load 44 to be lowered.

The second valve assembly 120 is configured and arranged to selectively provide fluid communication between the pump 210 or reservoir 230 and one or more hydraulic lift or work cylinders 40 which are mechanically coupled to the work attachment. The operation of second valve assembly 120 allows for hydraulic fluid to cause the work attachment 202 to be selectively raised or lowered in a lifting function. The lowering speed of the lift cylinder(s) 40 can be a result of the flow through the second valve assembly 120. Flow through the second valve assembly 120 can be controlled by a pair of variable solenoid or voicecoil actuators 158, 160 acting on each end of the spool 124 of the valve 120. The variable solenoid or voicecoil actuators 158, 160 can be operated by the control system 50 via control lines 166, 170, respectively.

As shown, the second valve assembly 120 is a three-position, three-way valve in fluid communication with the pump 210, a tank reservoir 230, and the lift cylinder(s) 40. In the embodiment shown, second valve assembly 120 is movable from a closed or neutral position A, to a position B, and to position C. Positions B and C could be used for lifting or lowering, depending upon whether pump pressure is needed to prevent cavitation and whether the tank pressure is sufficient. In one embodiment, position B is typically used for lowering.

In the closed position A, ports 126A, 128A, and 130A of the second valve assembly 120 are closed such that the pump 210 and tank reservoir 230 are both isolated from the lifting cylinder(s) 40. In this position the work attachment 202 can generally be held in a static position and can be neither raised nor lowered. However, the work attachment 202 could lower to some extent if the gravity load is such that a sufficient vacuum condition would be created. In one operational control scheme, the second valve assembly 120 would be in the closed position A when the first valve assembly 20 is also in its closed position A.

In the lowering position B, the second valve assembly 120 is positioned such that ports 126B and 130B are placed in fluid communication with each other. This position allows for the pump 210 to be placed in fluid communication with the lifting cylinder(s) 40 such that pump can provide fluid power to lower the load beyond what would be achieved by gravity alone. In the lowering position, the tank reservoir 230 is blocked at port 28B. In one operational control scheme, the second valve assembly 120 would be in the lowering position B when the first valve assembly 20 is also in its lowering position C.

In the lifting position C, the second valve assembly 120 is positioned such that ports 128C and 130C are placed in fluid communication with each other. This position allows for the tank reservoir 230 to be placed in fluid communication with the lifting cylinder(s) 40. The lifting position C allows for fluid to drain from the rod side of the lifting cylinder(s) 40 to the tank reservoir 230, thereby allowing for the load 44 to be raised. In one operational control scheme, the second valve assembly 120 would be in the lifting position C when the first valve assembly 20 is also in its lifting position B.

The Electronic Control System

The hydraulic system operates in various modes depending on demands placed on the work machine (e.g., by an operator). The electronic control system monitors and allows for the various modes to be initiated at appropriate times.

An electronic controller 50 monitors various sensors and operating parameters of the hydraulic system 214 to configure the hydraulic system 214 into the most appropriate mode. Examples of operational modes are a work circuit lifting mode and a fail operational mode.

Figure 3:
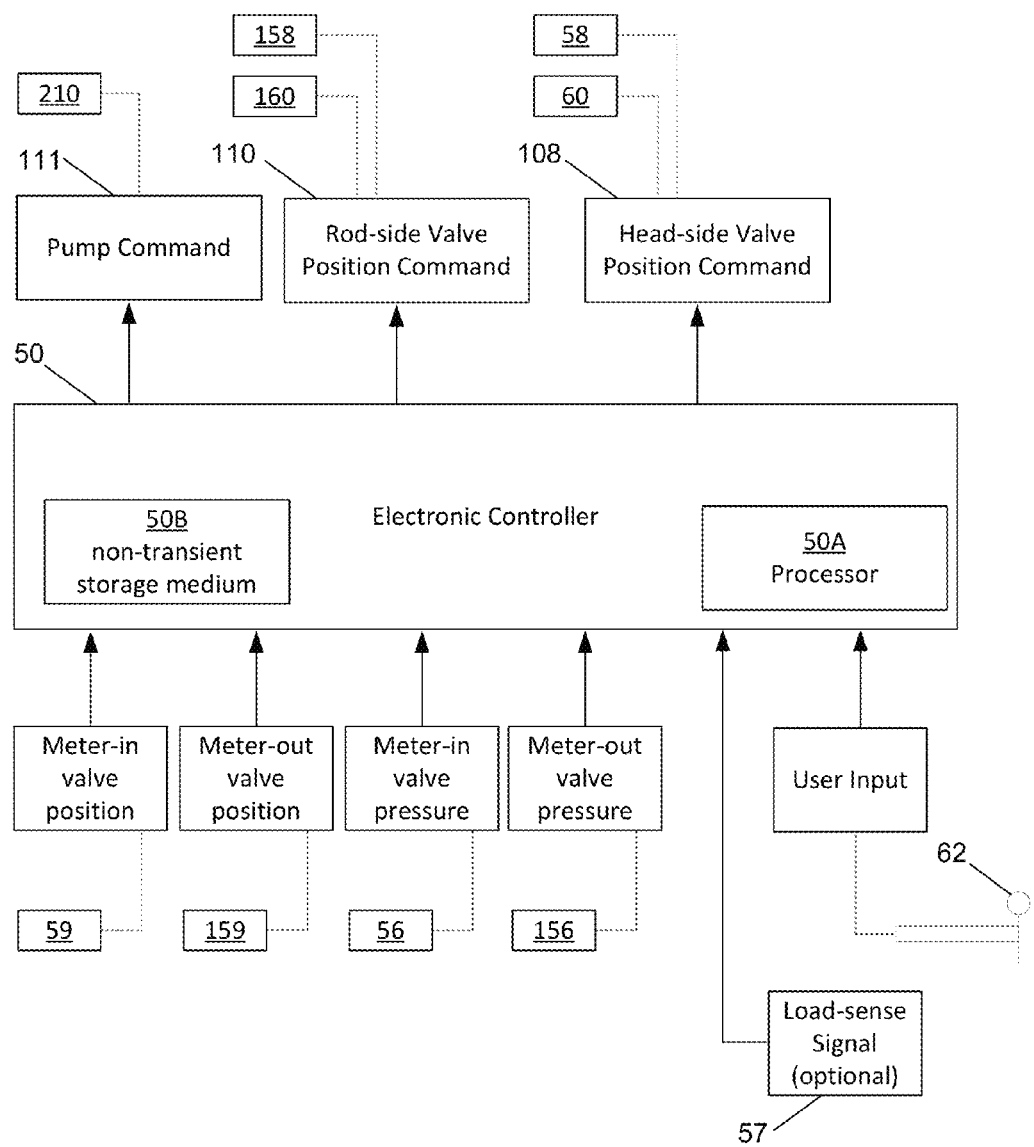
FIG. 3 is a schematic of an electronic control system for the hydraulic circuit shown in FIG. 2.

Referring to FIG. 3, the electronic controller 50 is schematically shown as including a processor 50A and a non-transient storage medium or memory 50B, such as RAM, flash drive or a hard drive. Memory 50B is for storing executable code, the operating parameters, the input from the operator interface while processor 50A is for executing the code.

Electronic controller 50 may have a number of inputs and outputs that may be used for implementing the work circuit lifting mode and the work circuit fail operational mode. For example, inputs and outputs may be in the form of pressure and position sensors on the first and second control valves 20, 120. Another example of an input is engine speed, which may be provided as a direct input into the electronic controller 50 or may be received from another portion of the control system via a control area network (CAN). The measured pump displacement, for example via a displacement feedback sensor, may also be provided.

One input into the electronic controller 50 is the lever position input from a lifting lever 62. In one embodiment, the lever position input is a direct digital signal from an electronic lever. The lifting lever 62 provides a user indication to the controller 50 that a load lifting operation by hydraulic lift cylinder(s) 40 is desired and also provides a means to control the raising and lowering of the load 44. Although lever 62 is characterized as a lifting lever, it should be understood that the disclosure is not limited to only lifting levers and that lever 62 can be any type of work lever without departing from the concepts disclosed herein. Other inputs to the controller are the signals from sensors 56, 59, 156, and 159. An optional load-sense signal 57 may also be provided to the controller or directly to the pump 210. In the embodiment shown, the load-sense demand is derived from the pressure sensors.

Still referring to FIG. 3, a number of outputs from the electronic controller 50 are shown. One output is a valve position command 108 to the first control valve 20. In the particular embodiment shown, the valve command output 108 is a proportional signal to the solenoid or voicecoil valves 58, 60 of control valve 20 via control lines 66, 70. Another output is a valve position command 110 to the second control valve 120. In the particular embodiment shown, the valve command output 110 is a proportional signal to the solenoid or voicecoil valves 158, 160 of control valve 120 via control lines 166, 170. Another output may be a pump command output 111 to control the flow and/or pressure generated by the pump 210.

The electronic controller 50 may also include a number of algorithms or control schemes to correlate the inputs and outputs of the controller 502. In one embodiment, the controller 50 includes an algorithm to control the system in a work mode and a fail operational mode, as described further in the Method of Operation section below.

The electronic controller 50 may also store a number of predefined and/or configurable parameters and offsets for determining when each of the modes is to be initiated and/or terminated. As used herein, the term "configurable" refers to a parameter or offset value that can either be selected in the controller (i.e. via a dipswitch) or that can be adjusted within the controller.

Sensor Fault States

Referring to FIGS. 4-9, the system is shown in various operating and fault states for which corresponding fail operational modes (discussed later) can be implemented.

Figure 4:
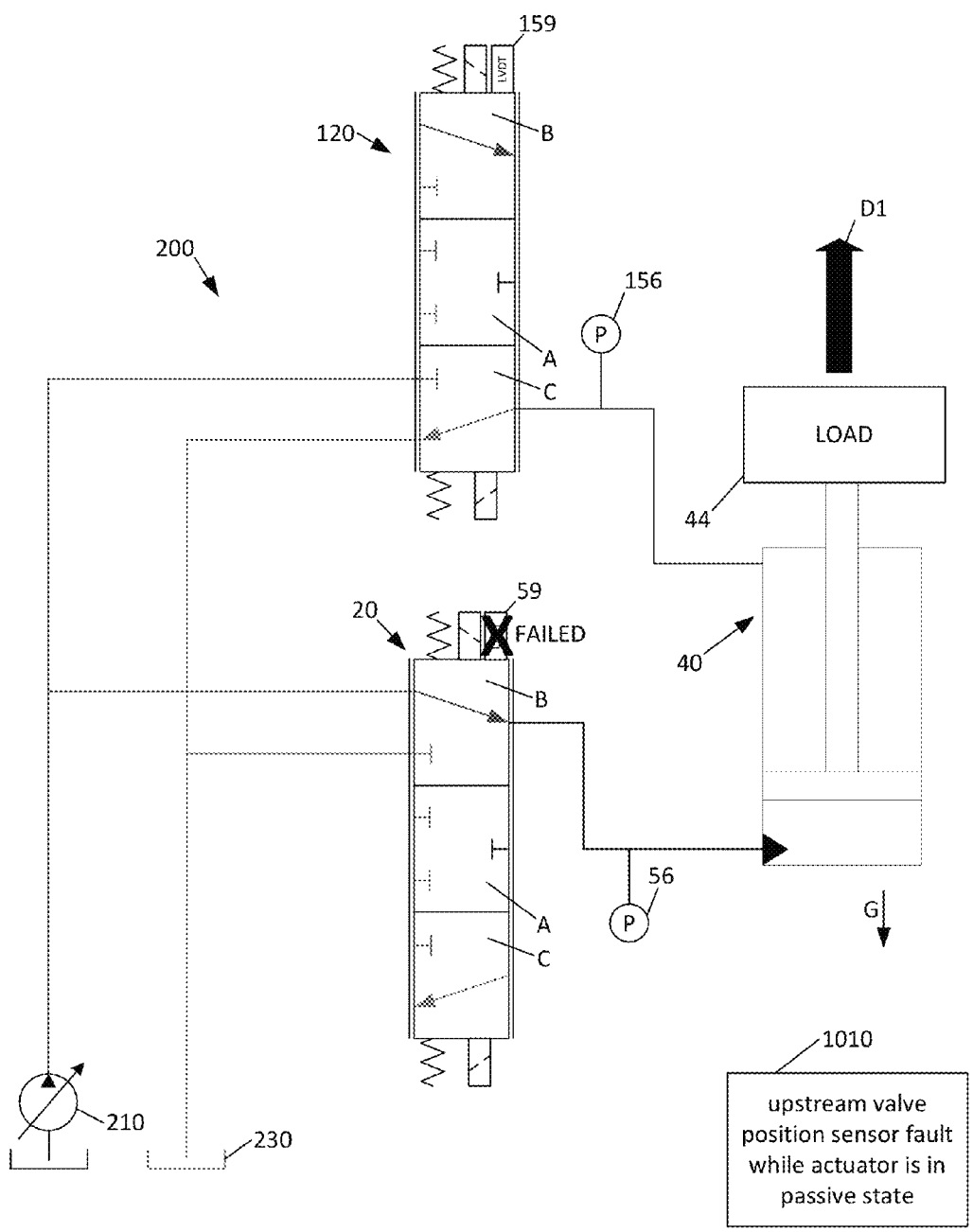
FIG. 4 is a schematic of the electro-hydraulic system of FIG. 1 with an upstream valve position sensor fault while the actuator is in a passive state.

FIG. 4 shows the system in a first fault state 1010 wherein position sensor 59 has faulted and the actuator 40 is in a passive condition. By use of the term "passive condition" it is meant to indicate that the load is being forced in a direction D1 that is generally opposite the direction of an external opposing force G, such as gravity (i.e. the load 44 is being lifted). As shown, the first control valve assembly 20 is in position B to place the pump 210 in fluid communication with the head side of the actuator 40 while the second control valve assembly 120 is in position C to place the rod side of the actuator 40 in fluid communication with the tank 230. In such a condition, the first control valve assembly 20 can be referenced as the upstream valve and the second control valve assembly 120 can be referenced as the downstream control valve.

Figure 5:
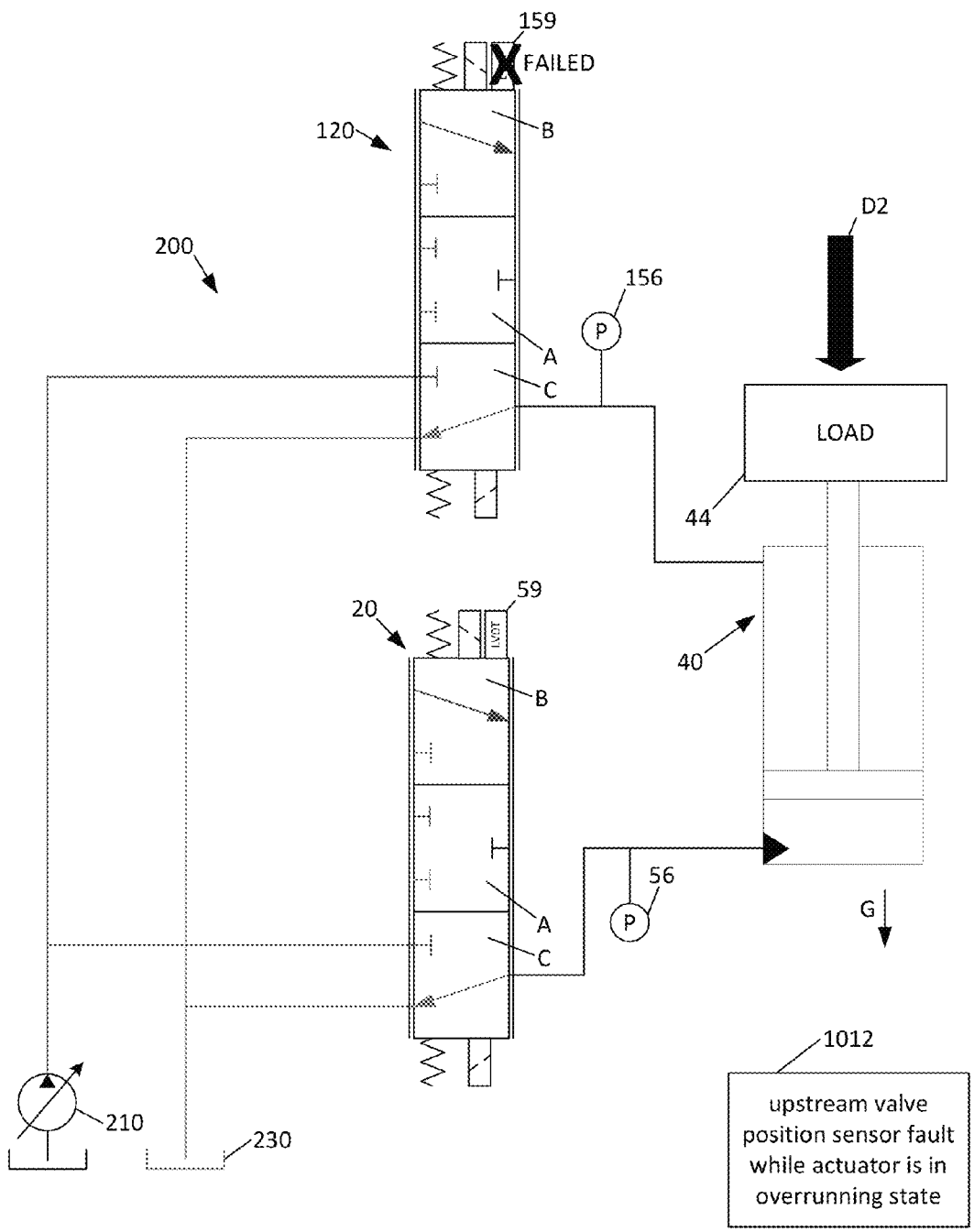
FIG. 5 is a schematic of the electro-hydraulic system of FIG. 1 with an upstream valve position sensor fault while the actuator is in an overrunning state.

FIG. 5 shows the system in a second fault state 1012 wherein position sensor 59 has faulted and the actuator 40 is in an overrunning condition. By use of the term "overrunning condition" it is meant to indicate that the load moving in a direction D2 that is in the same general direction of an external force G, such as gravity (i.e. the load 44 is falling). As shown, the first control valve assembly 20 is in position C to place the tank 230 in fluid communication with the head side of the actuator 40 while the second control valve assembly 120 is also in position C to place the rod side of the actuator 40 in fluid communication with the tank 230. In such a condition, the first control valve assembly 20 can be referenced as the downstream valve and the second control valve assembly 120 can be referenced as the upstream control valve.

Figure 6:
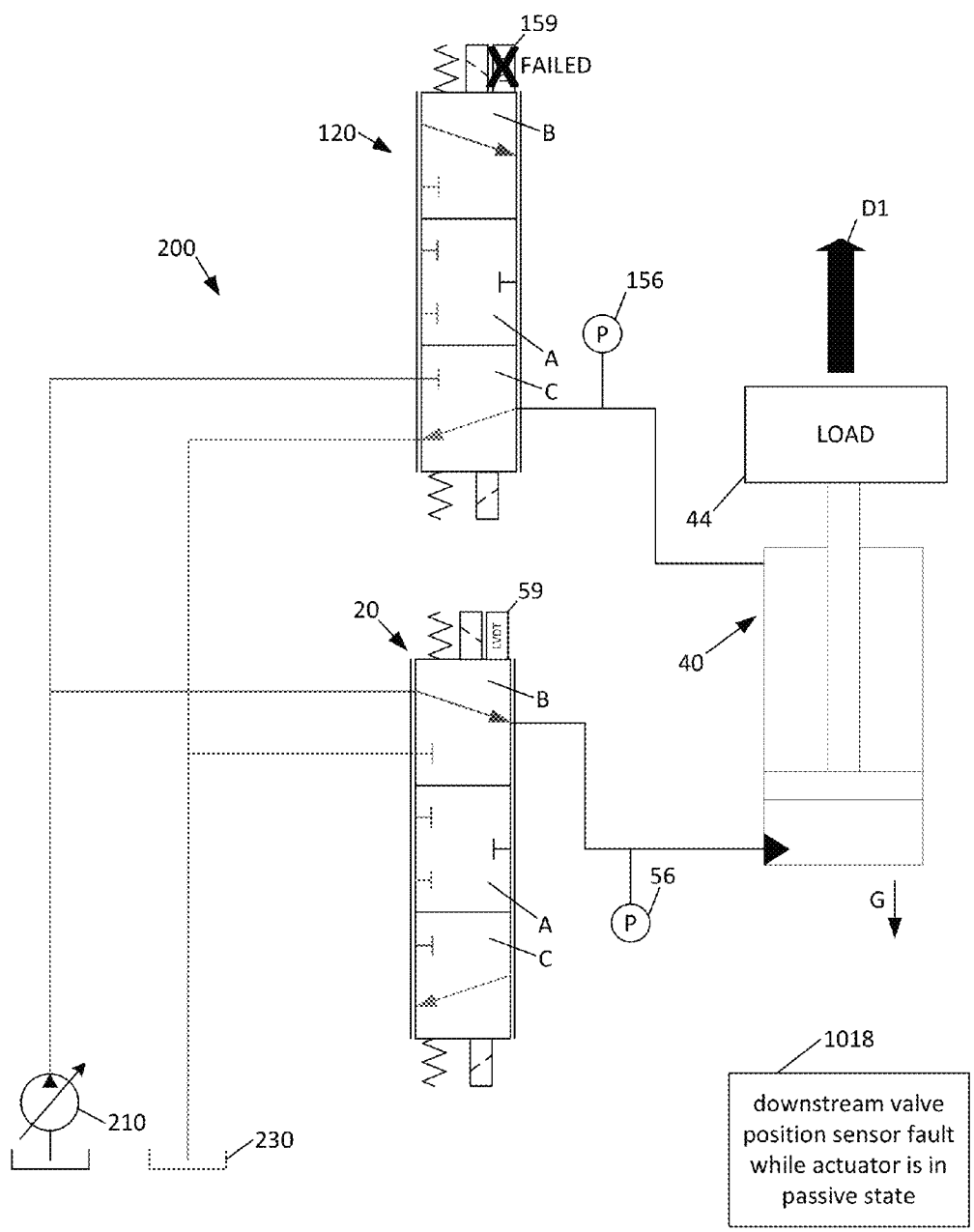
FIG. 6 is a schematic of the electro-hydraulic system of FIG. 1 with a downstream valve position sensor fault while the actuator is in a passive state.

FIG. 6 shows the system in a third fault state 1018 wherein position sensor 159 has faulted and the actuator 40 is in a passive condition. As shown, the first control valve assembly 20 is in position B to place the pump 210 in fluid communication with the head side of the actuator 40 while the second control valve assembly 120 is in position C to place the rod side of the actuator 40 in fluid communication with the tank 230. In such a condition, the first control valve assembly 20 can be referenced as the upstream valve and the second control valve assembly 120 can be referenced as the downstream control valve.

Figure 7:
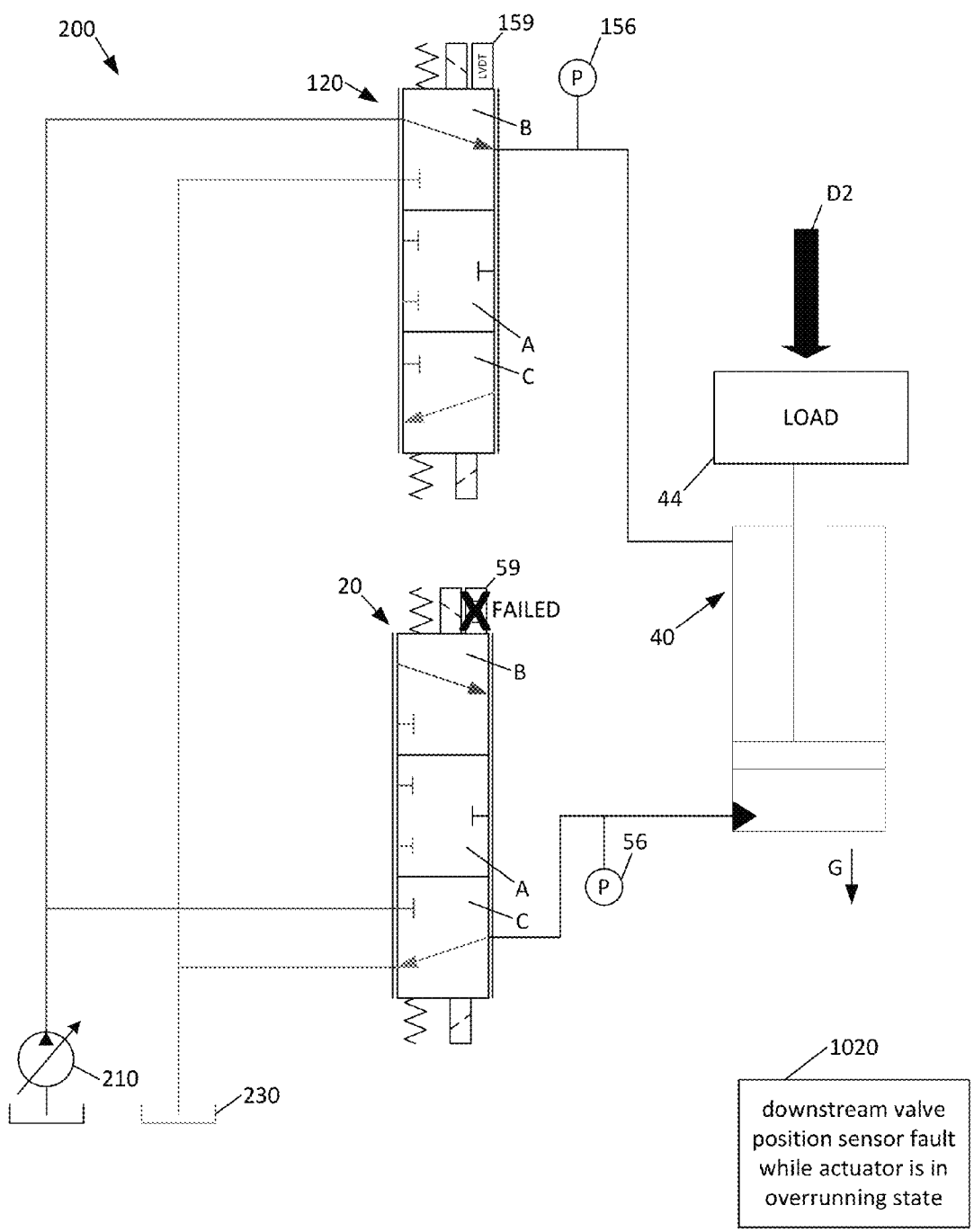
FIG. 7 is a schematic of the electro-hydraulic system of FIG. 1 with a downstream valve position sensor fault while the actuator is in an overrunning state.

FIG. 7 shows the system in a fourth fault state 1020 wherein position sensor 59 has faulted and the actuator 40 is in an overrunning condition. By use of the term "overrunning condition" it is meant to indicate that the load moving in a direction D2 that is in the same general direction of an external force G, such as gravity (i.e. the load 44 is falling). As shown, the first control valve assembly 20 is in position C to place the tank 230 in fluid communication with the head side of the actuator 40 while the second control valve assembly 120 is in position B to place the rod side of the actuator 40 in fluid communication with the pump 210 such that the load can be powered down. In such a condition, the first control valve assembly 20 can be referenced as the downstream valve and the second control valve assembly 120 can be referenced as the upstream control valve.

Figure 8:
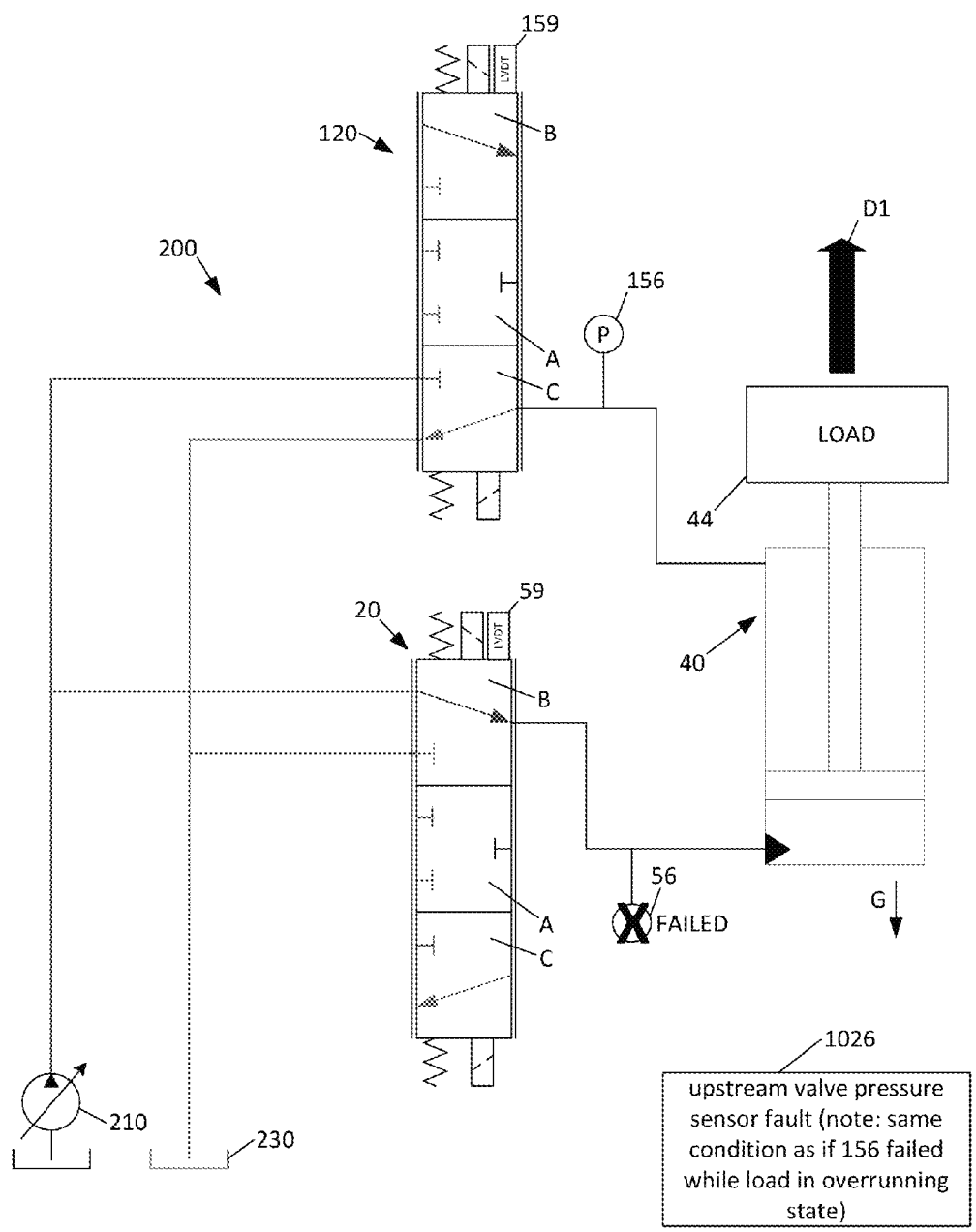
FIG. 8 is a schematic of the electro-hydraulic system of FIG. 1 with an upstream valve pressure sensor fault.

FIG. 8 shows the system in a fifth fault state 1026 wherein pressure sensor 56 has faulted and the actuator 40 is in a passive condition. As shown, the first control valve assembly 20 is in position B to place the pump 210 in fluid communication with the head side of the actuator 40 while the second control valve assembly 120 is in position C to place the rod side of the actuator 40 in fluid communication with the tank 230. In such a condition, the first control valve assembly 20 can be referenced as the upstream valve and the second control valve assembly 120 can be referenced as the downstream control valve. In the fifth fault state 1026, pressure sensor 56 is associated with the upstream valve, first valve assembly 20. However, the fifth fault state can also be established with a fault in pressure sensor 156 with the actuator 40 in an overrunning condition wherein the pressure sensor 156 is associated with the upstream valve, second valve assembly 120.

Figure 9:
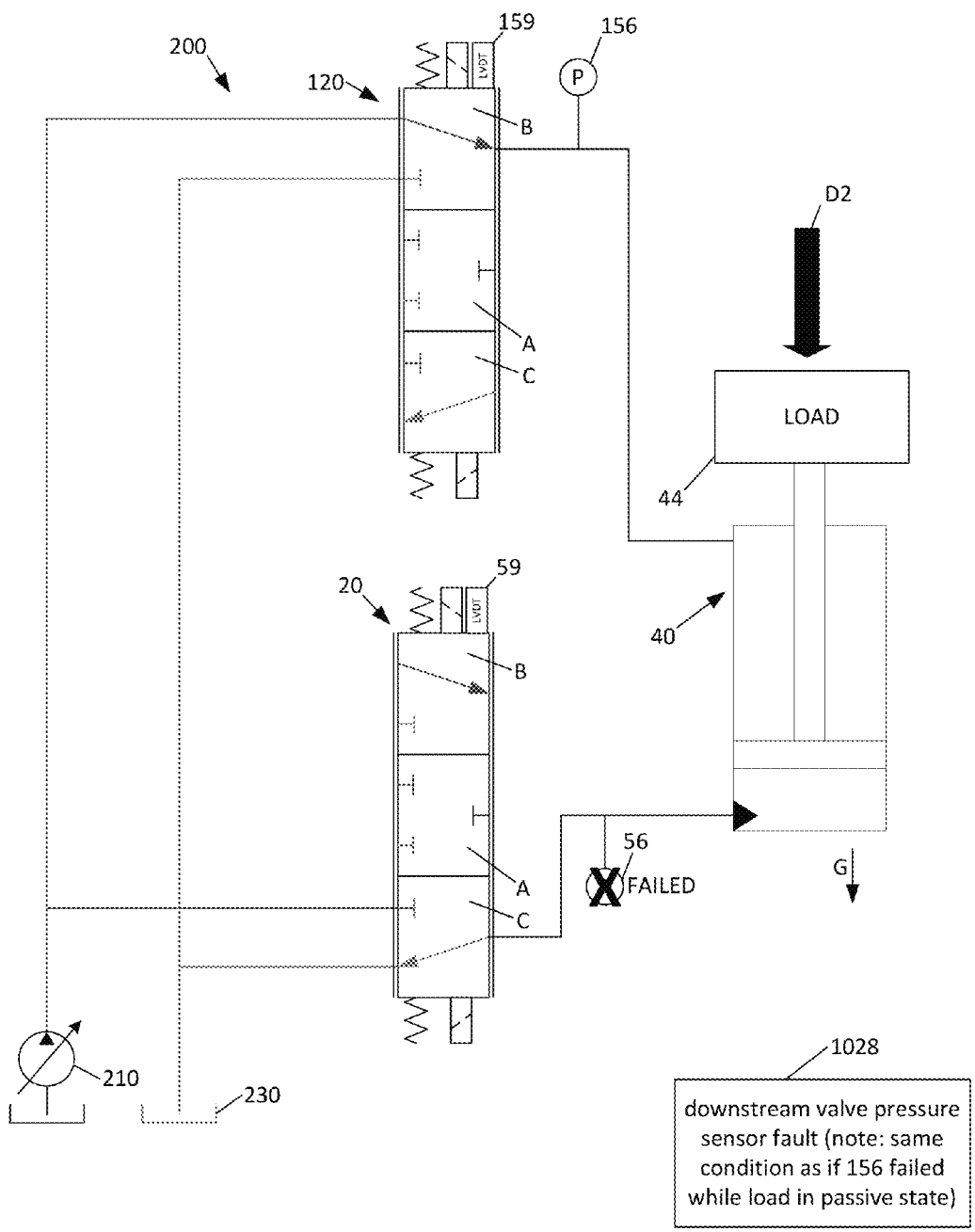
FIG. 9 is a schematic of the electro-hydraulic system of FIG. 1 with a downstream valve pressure sensor fault.

FIG. 9 shows the system in a sixth fault state 1028 wherein pressure sensor 56 has faulted and the actuator 40 is in an overrunning condition. As shown, the first control valve assembly 20 is in position C to place the tank 230 in fluid communication with the head side of the actuator 40 while the second control valve assembly 120 is in position B to place the rod side of the actuator 40 in fluid communication with the pump 210 such that the load can be powered down. In such a condition, the first control valve assembly 20 can be referenced as the downstream valve and the second control valve assembly 120 can be referenced as the upstream control valve. In the sixth fault state 1026, pressure sensor 56 is associated with the downstream valve, first valve assembly 20. However, the sixth fault state can also be established with a fault in pressure sensor 156 with the actuator 40 in a passive condition wherein the pressure sensor 156 is associated with the downstream valve, second valve assembly 120.

Method of Operation

Referring to FIGS. 10-17, methods 1000 to 1700 of determining and initiating fail operational modes are shown. It is noted that although the figures diagrammatically show the method steps in a particular order, the method is not necessarily intended to be limited to being performed in the shown order. Rather at least some of the shown steps may be performed in an overlapping manner, in a different order and/or simultaneously.

Figure 10:
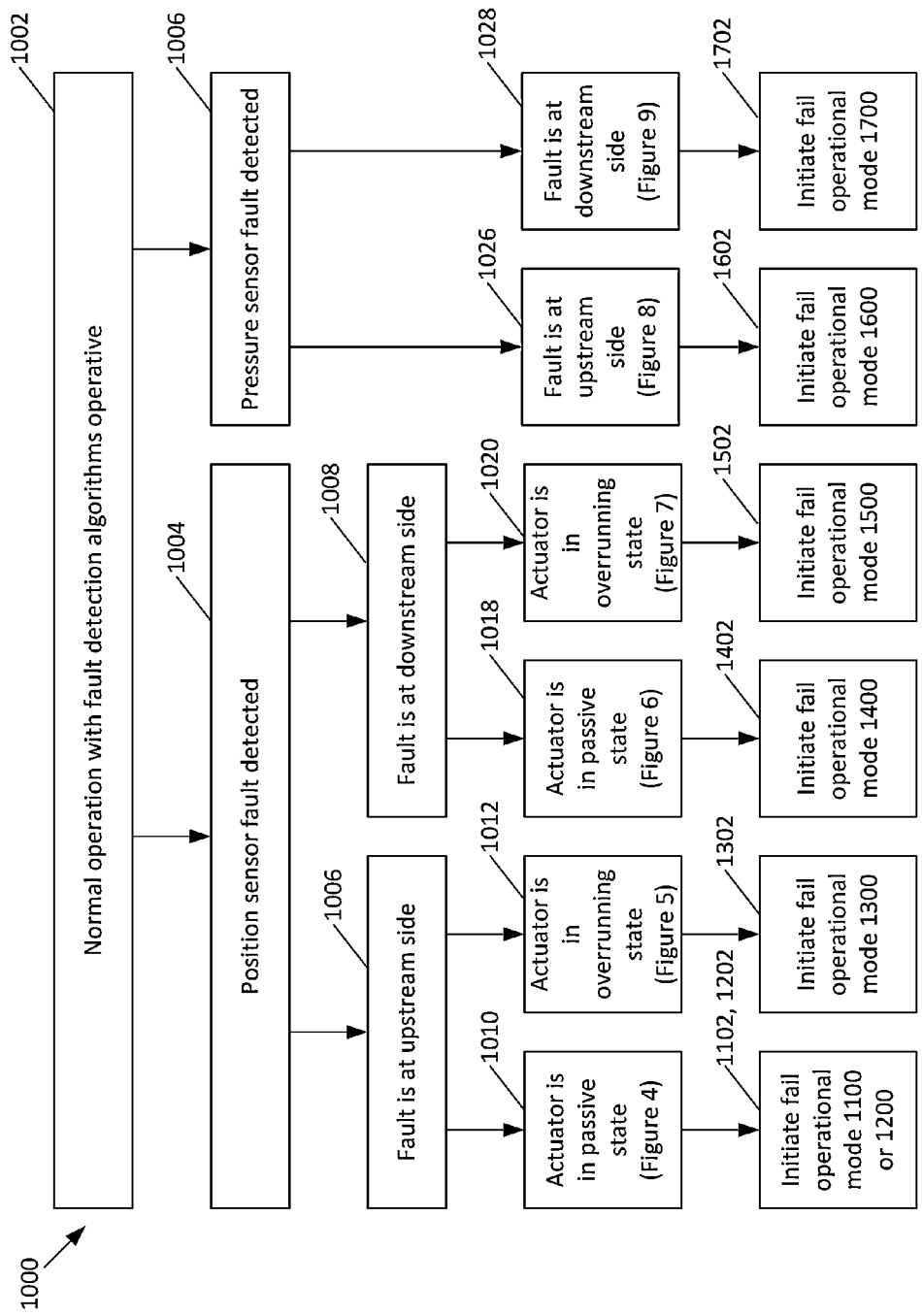
FIG. 10 is a flow chart for determining a fail operational mode to initiate in response to a detected sensor fault in the electro-hydraulic system of FIG. 1.

Referring to FIG. 10, decision chart 1000 is shown wherein a pressure or position sensor fault is detected and an appropriate fail operational mode is initiated. At step 1002, normal operation with fault detection algorithms are operative. At step 1004 a position sensor fault is detected while at step 1006 a pressure sensor fault is detected.

Where a position sensor fault is detected, it is then determined whether the fault is on the upstream side of the actuator at condition 1006 or on the downstream side of the actuator 40 at condition 1008. Where the fault is on the upstream side, it is then determined whether the actuator is in a passive state at condition 1010 after which fail operational mode 1100 or 1200 is initiated at step 1102, 1202, or an overrunning state at condition 1012 after which fail operational mode 1300 is initiated at step 1302. Where the fault is on the downstream side, it is then determined whether the actuator is in a passive state at condition 1018 after which fail operational mode 1400 is initiated at step 1402, or an overrunning state at condition 1020 after which fail operational mode 1500 is initiated at step 1502.

Where a pressure sensor fault is detected, it is then determined whether the fault is on the upstream side of the actuator 40 at condition 1026 or on the downstream side of the actuator 40 at condition 1028. Where the fault is on the upstream side, fail operational mode 1600 is initiated at step 1602. Where the fault is on the downstream side, fail operational mode 1700 is initiated at step 1702.

Figure 11:
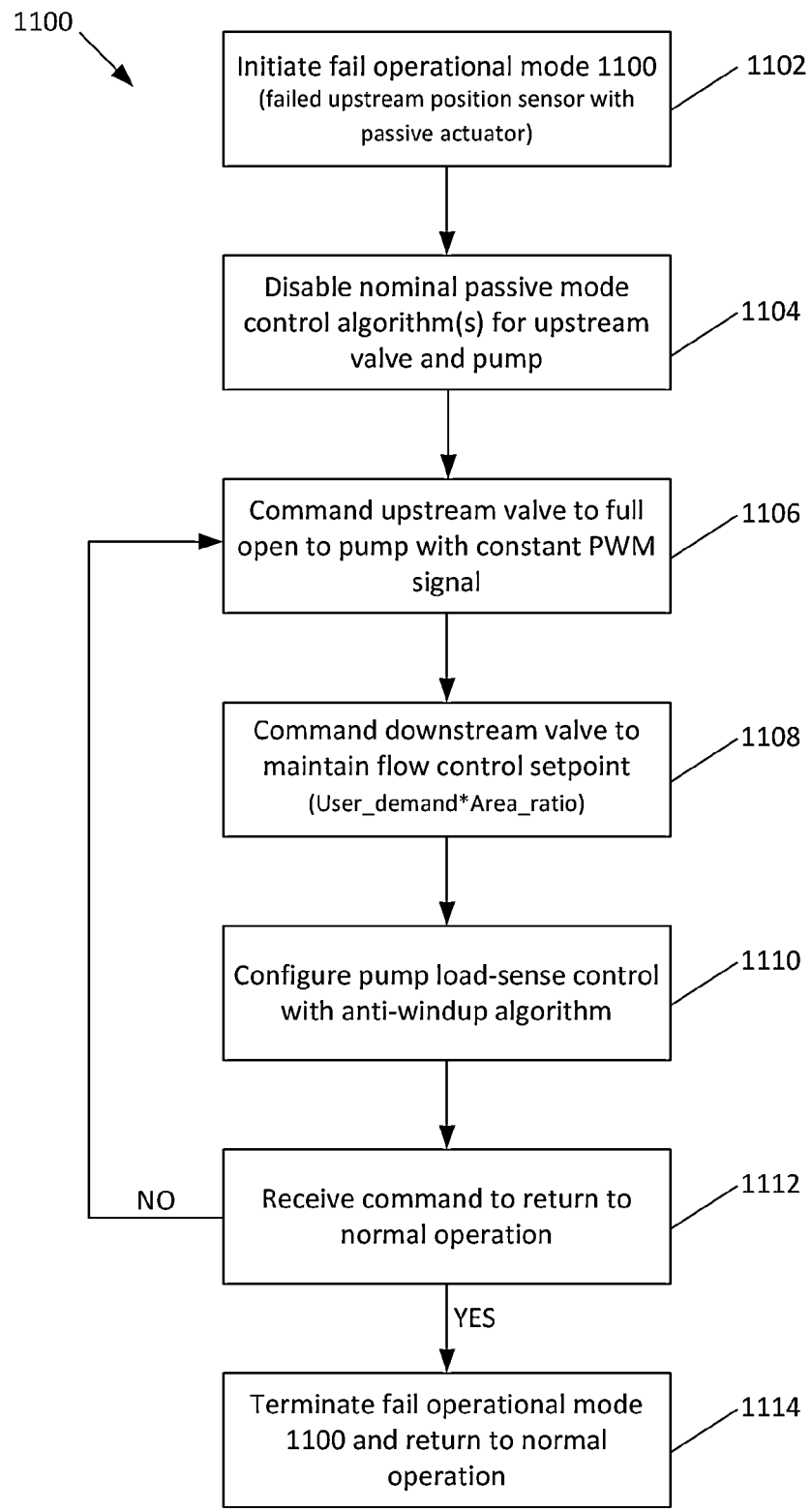
FIG. 11 is a flow chart showing the steps of fail operational mode 1100 identified in FIG. 10.

Referring to FIG. 11, fail operational mode 1100 is schematically shown in further detail. As related above, the fail operational mode 1100 is initiated at step 1102 based on the decision chart analysis and method 1000. In a step 1104, the normal passive mode control algorithms(s) for the upstream valve and pump are disabled. In a step 1106, the upstream valve is commanded to fully open to the pump, for example with a constant pulse width modulation (PWM) signal. The PWM signal is used to provide a controlled current and a means to control the electrical current to the valve.

In a step 1108, the downstream valve is commanded to maintain a flow control set point, for example a set point equal to the user demand multiplied by the area ratio (User_Demand*Area_Ratio). In a step 1110, the pump load-sense control may be configured with an anti-windup algorithm, meaning an algorithm that prevents the pump output from undesirably ramping upwards in response to the closing downstream valve. In one embodiment, the anti-windup algorithm corrects the normal load-sense demand (Pin+ margin) by subtracting the absolute difference between Pout and a limit value, for example, max(Pout−limit, 0).

In a step 1112, it is assessed whether a command has been received to return to normal operation. This would be the case where the faulted sensor has been corrected or replaced. If such a command has been received, the fail operational mode 1100 terminates and normal operation returns at step 1114. If no such command is received, the procedure returns to step 1106.

Figure 12:
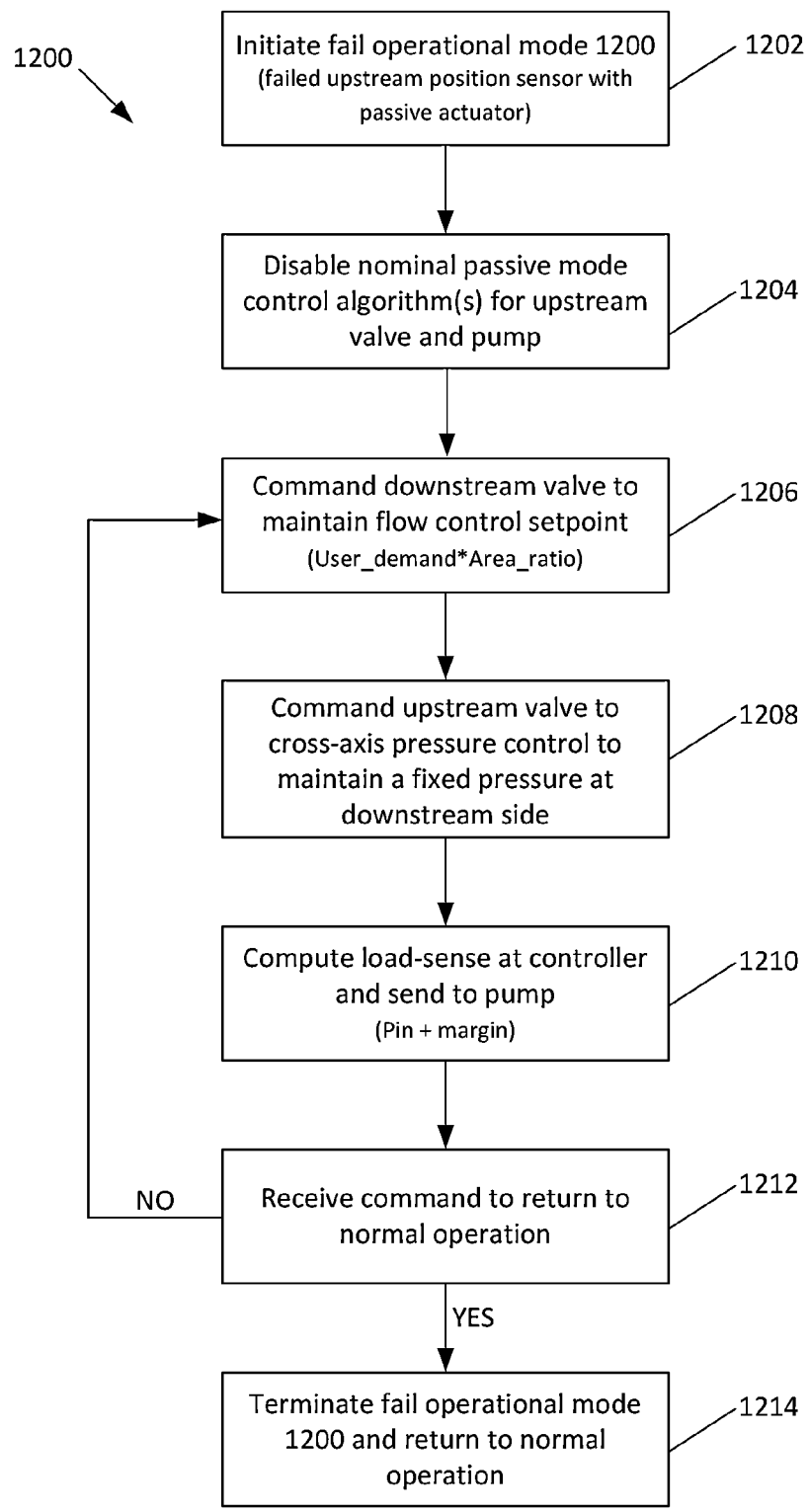
FIG. 12 is a flow chart showing the steps of fail operational mode 1200 identified in FIG. 10.

Referring to FIG. 12, fail operational mode 1200 is schematically shown in further detail. Fail operational mode 1200 is an alternative to fail operational mode 1100. As related above, the fail operational mode 1200 can be initiated at step 1202 based on the decision chart analysis and method 1000. In a step 1204, the normal passive mode control algorithms(s) for the upstream valve and pump are disabled. In a step 1206, the downstream valve is commanded to maintain a flow control set point, for example a set point equal to the user demand multiplied by the area ratio (User_Demand*Area_Ratio). In a step 1208, the upstream valve is operated with a cross-axis pressure control approach in which the valve is commanded to maintain a fixed pressure at the downstream side. Alternatively, instead of fully opening the upstream side to the pump or directly controlling the downstream pressure, the upstream margin can be controlled. When combined with the anti-windup algorithm, such an approach results in a similar operation to the above described approach with mode 1200 wherein the downstream pressure is controlled to a desired value, but the error variable into the controller is different.

The cross-axis pressure control approach is advantageous in that most controllers operate on an error between a measured value and a desired set point. Often, the measured value and the set point are for a system which is directly controlled by the control device (e.g. a control valve). In the present method, a set point is used as is a measured value on the other side of the actuator, which is not in direct contact with the controlled valve. Rather, there is an actuator and a load in between the valve and the work port being controlled. By taking advantage of the circumstance that the flow in and flow out of the actuator are related, and by specifying how the valve on the other work port is controlled, the error value on the other side of the actuator becomes meaningful for the valve that is using cross-axis control. For example, in this case, if the flow out is controlled by the downstream valve, then the same amount of flow (modified by the Area Ratio) is required into the upstream side to make sure the pressure does not drop. Therefore, if the upstream valve can be adjusted to make sure the downstream pressure is held constant, then it is known that the flow in and the flow out are matched.

At step 1210, the load-sense signal is computed at the controller and sent to the pump, for example, Pin+margin.

In a step 1212, it is assessed whether a command has been received to return to normal operation. This would be the case where the faulted sensor has been corrected or replaced. If such a command has been received, the fail operational mode 1200 terminates and normal operation returns at step 1214. If no such command is received, the procedure returns to step 1206.

Figure 13:
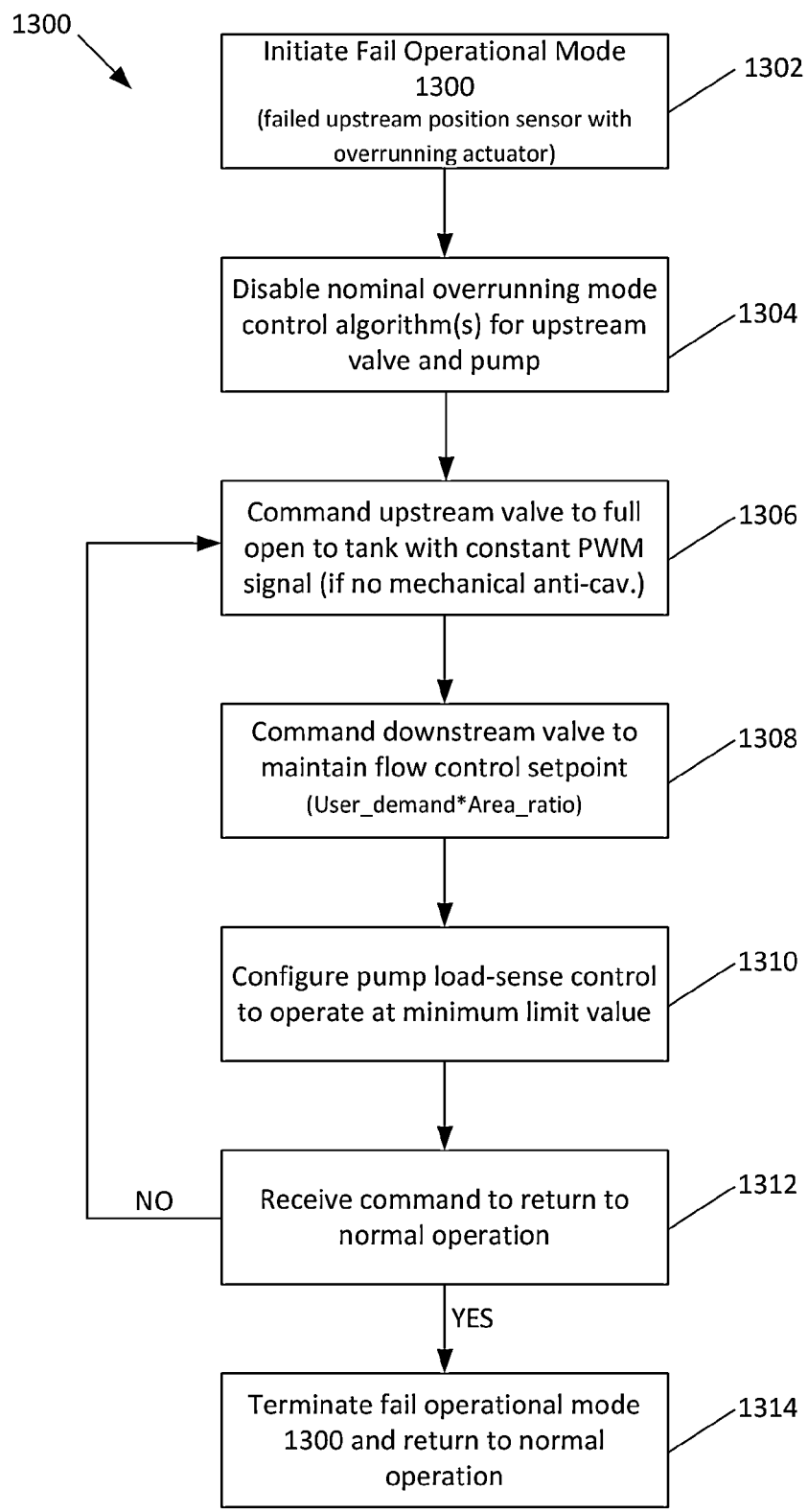
FIG. 13 is a flow chart showing the steps of fail operational mode 1300 identified in FIG. 10.

Referring to FIG. 13, fail operational mode 1300 is schematically shown in further detail. As related above, the fail operational mode 1300 can be initiated at step 1302 based on the decision chart analysis and method 1000. In a step 1304, the normal overrunning mode control algorithms(s) for the upstream valve and pump are disabled. In a step 1306, the upstream valve is commanded to fully open to the tank, for example with a constant pulse width modulation (PWM) signal. It is noted that the upstream valve does not necessarily need to be opened to tank if mechanical anti-cavitation valves are provided in the system.

In a step 1308, the downstream valve is commanded to maintain a flow control set point, for example a set point equal to the user demand multiplied by the area ratio (User_Demand*Area_Ratio). In a step 1310, the pump load-sense control may be configured to operate at a minimum limit value. In a step 1312, it is assessed whether a command has been received to return to normal operation. This would be the case where the faulted sensor has been corrected or replaced. If such a command has been received, the fail operational mode 1300 terminates and normal operation returns at step 1314. If no such command is received, the procedure returns to step 1306.

Fail operational mode 1300 may alternatively be configured such that the meter-in side will partially open to the pump instead of the tank to prevent cavitation if the tank pressure is too low. With such an approach, the meter in spool can be configured to be in a pressure control operational mode and referencing the upstream pressure sensor.

Figure 14:
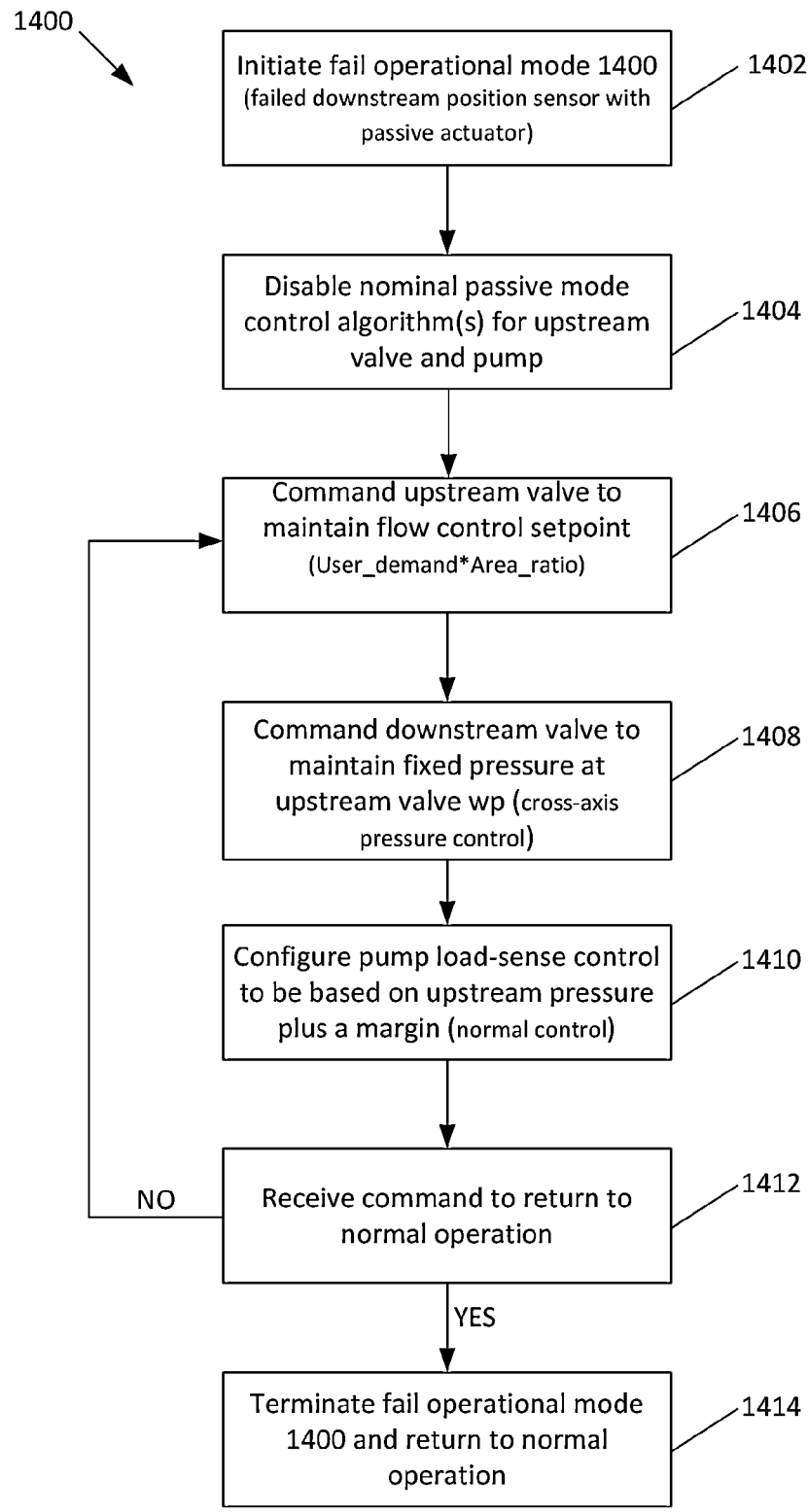
FIG. 14 is a flow chart showing the steps of fail operational mode 1400 identified in FIG. 10.

Referring to FIG. 14, fail operational mode 1400 is schematically shown in further detail. As related above, the fail operational mode 1400 can be initiated at step 1402 based on the decision chart analysis and method 1000. In a step 1404, the normal passive mode control algorithms(s) for the upstream valve and pump are disabled. In a step 1406, the upstream valve is commanded to maintain a flow control set point, for example a set point equal to the user demand multiplied by the area ratio (User_Demand*Area_Ratio). In a step 1408, the downstream valve is operated with a cross-axis pressure control approach in which the valve is commanded to maintain a fixed pressure at the upstream side work port. It is noted that this step could also include fully opening the downstream valve as it may be likely in many cases that the cross-axis pressure control approach would result in a fully opened valve. As the upstream pressure will in many cases be high, especially where a heavy load is involved, the downstream valve will fully open in an attempt to reduce the pressure to the desired setting. However, using the cross-axis pressure control approach is advantageous at least in that other conditions are addressed by the algorithm and in that the control of the valve can remain the same in both the passive and overrunning conditions instead of switching between two operational modes.

At step 1410, the load-sense signal is based on the upstream pressure plus a margin, which may be the normal operating mode for the pump in certain applications. In a step 1412, it is assessed whether a command has been received to return to normal operation. This would be the case where the faulted sensor has been corrected or replaced. If such a command has been received, the fail operational mode 1400 terminates and normal operation returns at step 1414. If no such command is received, the procedure returns to step 1406.

Figure 15:
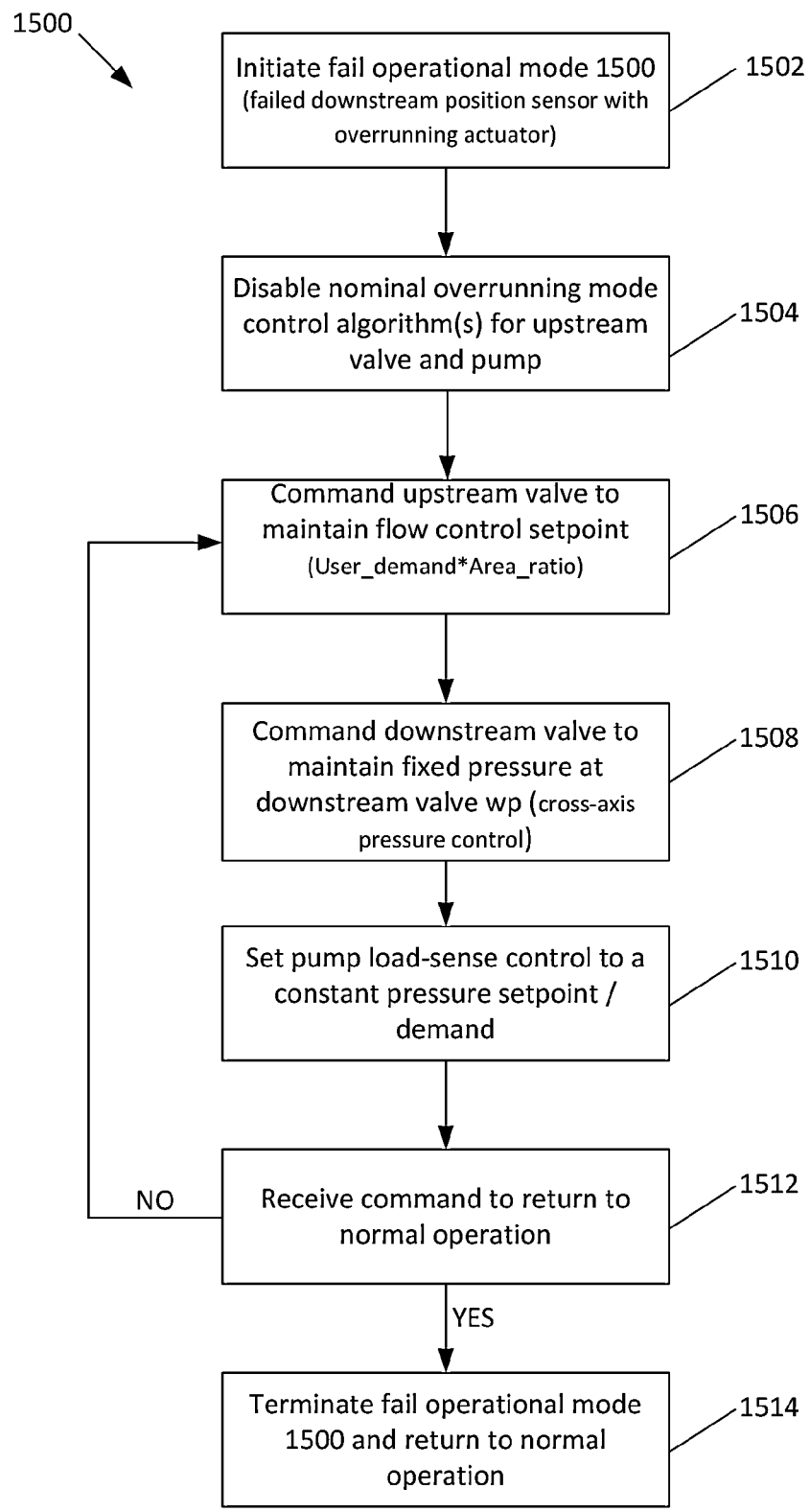
FIG. 15 is a flow chart showing the steps of fail operational mode 1500 identified in FIG. 10.

Referring to FIG. 15, fail operational mode 1500 is schematically shown in further detail. As related above, the fail operational mode 1500 can be initiated at step 1502 based on the decision chart analysis and method 1000. In a step 1504, the normal overrunning mode control algorithms(s) for the upstream valve and pump are disabled. In a step 1506, the upstream valve is commanded to maintain a flow control set point, for example a set point equal to the user demand multiplied by the area ratio (User_Demand*Area_Ratio). In a step 1508, the downstream valve is operated with a cross-axis pressure control approach in which the valve is commanded to maintain a fixed pressure at the upstream side work port. As the flow into the actuator through the upstream valve can be calculated, the cross-axis pressure control approach at the downstream valve operates to ensure that the pressure on the upstream side does not drop or spike by controlling the fluid flow leaving the actuator. At step 1510, the load-sense signal is set to a constant pressure set point or demand signal. In a step 1512, it is assessed whether a command has been received to return to normal operation. This would be the case where the faulted sensor has been corrected or replaced. If such a command has been received, the fail operational mode 1500 terminates and normal operation returns at step 1514. If no such command is received, the procedure returns to step 1506.

Figure 16:
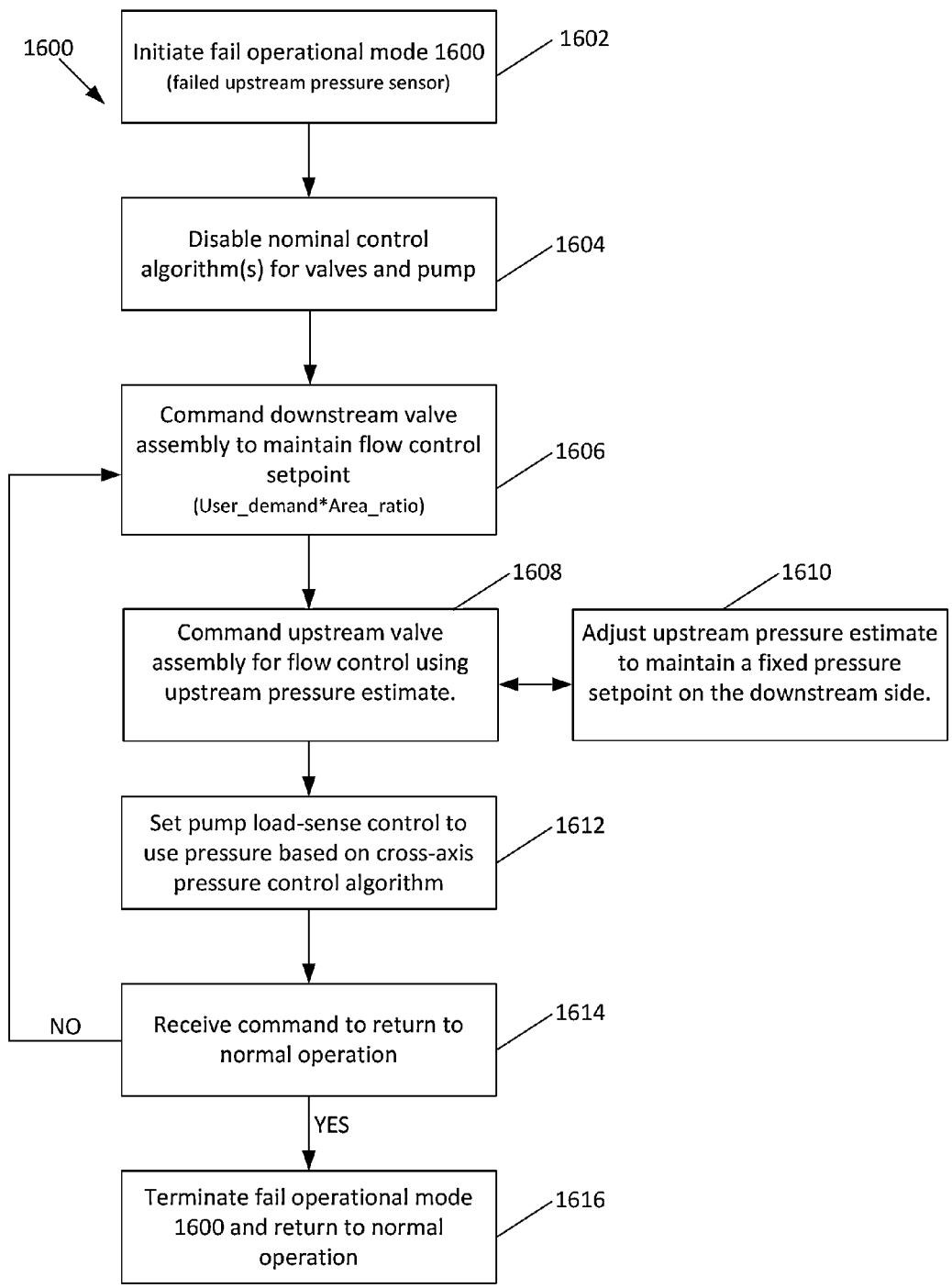
FIG. 16 is a flow chart showing the steps of fail operational mode 1600 identified in FIG. 10.

Referring to FIG. 16, fail operational mode 1600 is schematically shown in further detail. As related above, the fail operational mode 1600 can be initiated at step 1602 based on the decision chart analysis and method 1000. Because a pressure sensor has failed in this operational mode, it is indeterminate whether the actuator is in a passive state or an overrunning state. However, as it can be known from the system which direction the actuator is moving, and therefore it can be determined which valve is the upstream valve and which valve is the downstream valve. In a step 1604, the normal control algorithms(s) for the upstream and downstream valve assemblies and pump are disabled.

In a step 1606, the downstream valve assembly 120 is commanded to maintain a flow control set point, for example a set point equal to the user demand multiplied by the area ratio (User_Demand*Area_Ratio). In a step 1608, the upstream valve assembly 20 is commanded to maintain a flow control set point based on an estimate of the pressure at the upstream valve assembly. The pressure estimate can be adjusted at step 1610 to maintain a fixed set point on the downstream valve assembly side in a variation of the cross-axis pressure control algorithm. With such an approach, the flow controller uses an estimated pressure drop to determine how open the valve should be Since the pressure difference isn't known, an estimate is used and then adjusted until the downstream pressure matches the desired set point. By adjusting the pressure estimate into the flow controller, the degree to which the valve is opened is thereby adjusted and a pressure value is also created that can be used to generate a load-sense demand.

At step 1612, the pump load-sense signal is set to use a pressure based on the upstream pressure estimate plus a margin. In a step 1614, it is assessed whether a command has been received to return to normal operation. This would be the case where the faulted sensor has been corrected or replaced. If such a command has been received, the fail operational mode 1600 terminates and normal operation returns at step 1616. If no such command is received, the procedure returns to step 1606.

Figure 17:
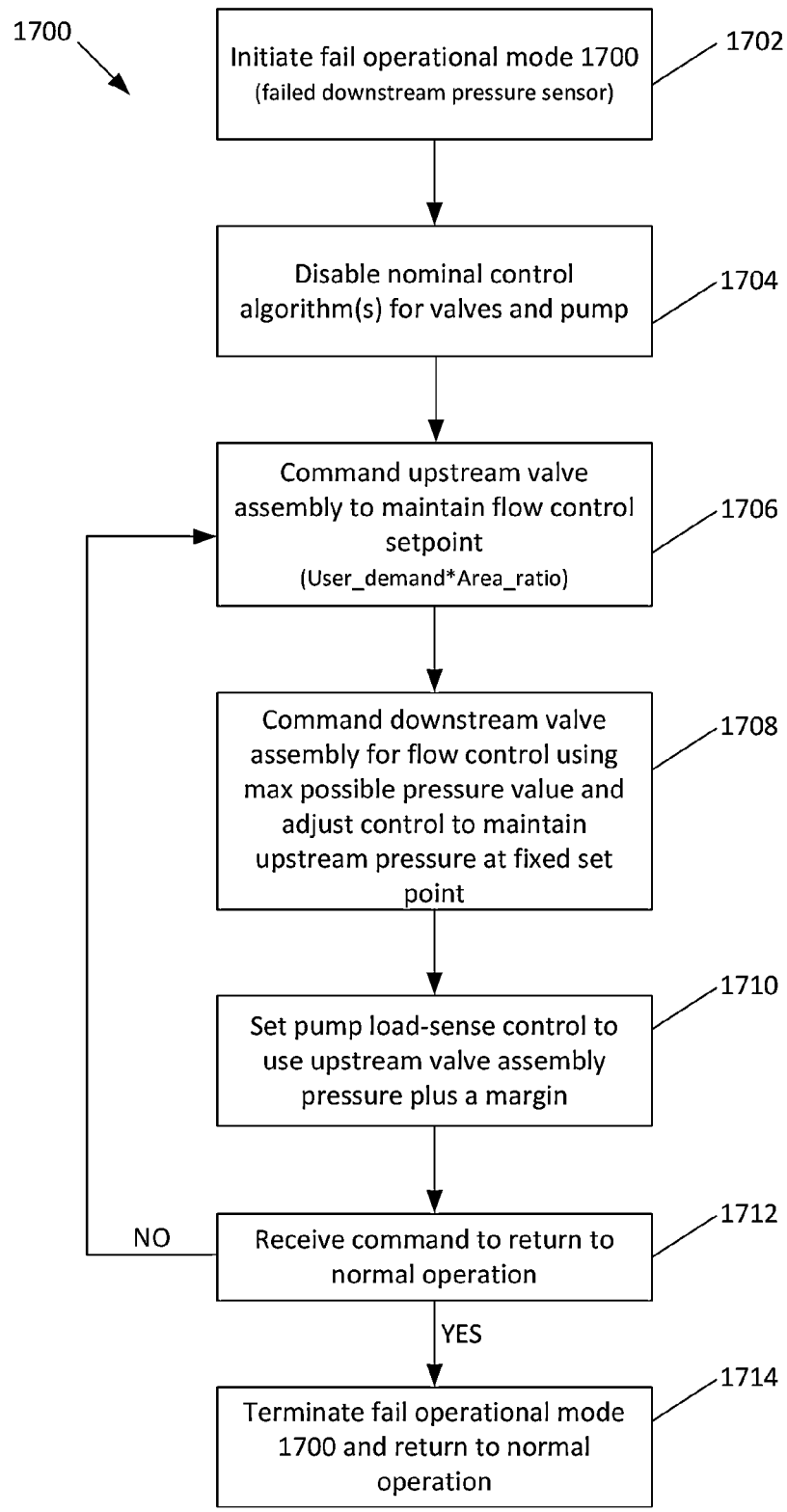
FIG. 17 is a flow chart showing the steps of fail operational mode 1700 identified in FIG. 10.

Referring to FIG. 17, fail operational mode 1700 is schematically shown in further detail. As related above, the fail operational mode 1700 can be initiated at step 1702 based on the decision chart analysis and method 1000. Because a pressure sensor has failed in this operational mode, it is indeterminate whether the actuator is in a passive state or an overrunning state. However, as it can be known from the system which direction the actuator is moving, and therefore it can be determined which valve is the upstream valve and which valve is the downstream valve. In a step 1704, the normal control algorithms(s) for the upstream and downstream valve assemblies and pump are disabled.

In a step 1706, the upstream valve assembly 20 is commanded to maintain a flow control set point (e.g. User_Demand). In a step 1708, the downstream valve assembly 120 is commanded for flow control using the maximum possible pressure value and adjusting control of the valve to maintain an upstream pressure at a fixed set point. It is noted that the control can be adjusted by changing the valve position or the estimated pressure into the flow controller, which results in a changed position.

At a step 1710, the pump load-sense signal is set to use a pressure based on the upstream valve assembly pressure plus a margin. In a step 1712, it is assessed whether a command has been received to return to normal operation. This would be the case where the faulted sensor has been corrected or replaced. If such a command has been received, the fail operational mode 1700 terminates and normal operation returns at step 1714. If no such command is received, the procedure returns to step 1706.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method for initiating and implementing fail operational modes in an electro-hydraulic system comprising the steps of:
   (a) providing a plurality of valve assemblies, each valve assembly having at least one of a pressure sensor and a position sensor in communication with an electronic system controller, the valve assemblies being in fluid communication with a hydraulic actuator, wherein the plurality of valve assemblies includes a first valve assembly in fluid communication with a head side of the actuator and a second valve assembly in fluid communication with a rod side of the actuator, wherein the actuator is a linear actuator associated with a lifting function of a work machine;
   (b) detecting a fault condition with one of the sensors;
   (c) determining a sensor type associated with the fault condition wherein a first sensor type is a fault condition is associated with one of the pressure sensors and a second sensor type is associated with a fault condition one of the position sensors,
   (d) determining a sensor location associated with the fault condition wherein a first location is associated with a sensor located at an upstream side of the actuator and a second location is associated with a sensor located at a downstream side of the actuator;
   (e) where a position sensor has failed, determining an actuator state the actuator being in a passive state or an overrunning state; and
   (f) initiating and implementing one of a plurality of fail operational modes based on the determination of the sensor type, the sensor location, and the actuator state associated with the fault condition, wherein initiating and implementing one of a plurality of fail operational modes includes disabling a normal control algorithm associated with the faulted sensor, the fail operational modes including:
      i. a first fail operational mode implemented when the sensor type is a position sensor, the sensor location is on the upstream side of the actuator, and the actuator is in a passive state;
      ii. a second fail operational mode implemented when the sensor type is a position sensor, the sensor location is on the upstream side of the actuator, and the actuator is in an overrunning state;
      iii. a third fail operational mode implemented when the sensor type is a position sensor, the sensor location is on the downstream side of the actuator, and the actuator is in a passive state;
      iv. a fourth fail operational mode implemented when the sensor type is a position sensor, the sensor location is on the downstream side of the actuator, and the actuator is in an overrunning state;
      v. a fifth fail operational mode implemented when the sensor type is a pressure sensor and the sensor location is on the upstream side of the actuator; and
      vi. a sixth fail operational mode implemented when the sensor type is a pressure sensor and the sensor location is on the downstream side of the actuator.

2. The method for initiating and implementing fail operational modes in an electro-hydraulic system of claim 1, wherein the first fail operational mode includes:
   a. commanding the valve assembly located on the upstream side of the actuator to fully open to a system pump;
   b. commanding the valve located on the downstream side of the actuator to maintain a flow control set point; and
   c. configuring a load-sense signal to the system pump with an anti-windup algorithm.

3. The method for initiating and implementing fail operational modes in an electro-hydraulic system of claim 1, wherein the first fail operational mode includes:
   a. commanding the valve assembly located on the upstream side of the actuator to maintain a fixed pressure at the pressure sensor located on the downstream side of the actuator; and b. commanding the valve located on the downstream side of the actuator to maintain a flow control set point.

4. The method for initiating and implementing fail operational modes in an electro-hydraulic system of claim 1, wherein the second fail operational mode includes:
   a. commanding the valve assembly located on the upstream side of the actuator to fully open to a system tank or to partially open to a system pump;
   b. commanding the valve located on the downstream side of the actuator to maintain a flow control set point; and
   c. configuring a load-sense signal to the system pump to operate the pump at a minimum limit value.

5. The method for initiating and implementing fail operational modes in an electro-hydraulic system of claim 1, wherein the third fail operational mode includes:
   a. commanding the valve assembly located on the upstream side of the actuator to maintain a flow control set point;
   b. commanding the valve located on the downstream side of the actuator to attempt to maintain a fixed pressure at the pressure sensor located on the upstream side of the actuator; and
   c. configuring a load-sense signal to the system pump be based on the pressure at the upstream side of the actuator plus a margin value.

6. The method for initiating and implementing fail operational modes in an electro-hydraulic system of claim 1, wherein the fourth fail operational mode includes:
   a. commanding the valve assembly located on the upstream side of the actuator to maintain a flow control set point;
   b. commanding the valve located on the downstream side of the actuator to maintain a fixed pressure at the pressure sensor located on the upstream side of the actuator; and
   c. configuring a load-sense signal to the system pump to maintain one of a constant pressure set point and a pressure setting plus a margin.

7. The method for initiating and implementing fail operational modes in an electro-hydraulic system of claim 1, wherein the fifth fail operational mode includes:
   a. commanding the downstream valve assembly to maintain a flow control set point;
   b. commanding the upstream valve assembly to maintain a flow control set point using an estimate for the pressure on the upstream side of the actuator, and adjust the estimate to maintain a fixed pressure set point on the downstream side of the actuator; and
   c. configuring a load-sense signal to the system pump to use a pressure based on an estimated upstream pressure plus a margin.

8. The method for initiating and implementing fail operational modes in an electro-hydraulic system of claim 1, wherein the sixth fail operational mode includes:
   a. commanding the upstream assembly to maintain a flow control set point;
   b. commanding the downstream valve assembly to maintain a flow control set point using the maximum possible pressure value and adjusting the control to maintain a fixed pressure on the upstream side of the actuator; and
   c. configuring a load-sense signal to the system pump to use a pressure based on the upstream valve assembly pressure measurement plus a margin value.

9. A method for initiating and implementing fail operational modes in an electro-hydraulic system comprising the steps of:
   a. providing a plurality of valve assemblies, each valve assembly having a pressure sensor in communication with an electronic system controller, the valve assemblies being in fluid communication with a hydraulic actuator;
   b. detecting a fault condition with one of the pressure sensors;
   c. determining a sensor location associated with the fault condition wherein a first location is associated with a sensor located at an upstream side of the actuator and a second location is associated with a sensor located at a downstream side of the actuator;
   d. initiating and implementing one of a plurality of fail operational modes based on the determination of the sensor location associated with the fault condition;
   e. wherein the plurality of fail operational modes includes a first pressure sensor fail operational mode implemented when the faulted pressure sensor location is on the upstream side of the actuator, the mode including:
      i. commanding the downstream valve assembly to maintain a flow control set point;
      ii. commanding the upstream valve assembly to maintain a flow control set point using an estimate for the pressure on the upstream side of the actuator, and adjust the estimate to maintain a fixed pressure set point on the downstream side of the actuator; and
      iii. configuring a load-sense signal to the system pump to use a pressure based on an estimated upstream pressure plus a margin.

10. The method for initiating and implementing fail operational modes in an electro-hydraulic system of claim 9, wherein the plurality of fail operational modes includes:
    a.
    b. a second pressure sensor fail operational mode implemented when the faulted pressure sensor location is on the downstream side of the actuator.

11. The method for initiating and implementing fail operational modes in an electro-hydraulic system of claim 10, wherein the second pressure sensor fail operational mode includes:
    a. commanding the upstream valve assembly to maintain a flow control set point;
    b. commanding the downstream valve assembly to maintain a flow control set point using the maximum possible pressure value and adjusting the control to maintain a fixed pressure on the upstream side of the actuator; and
    c. configuring a load-sense signal to the system pump to use a pressure based on the upstream valve assembly pressure plus a margin value.

\* \* \* \* \*